(12) United States Patent
St. Clair

(10) Patent No.: US 11,866,100 B2
(45) Date of Patent: Jan. 9, 2024

(54) VEHICLE

(71) Applicant: NISSAN NORTH AMERICA, INC., Franklin, TN (US)

(72) Inventor: Keith St. Clair, Brentwood, TN (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/510,269

(22) Filed: Oct. 25, 2021

(65) Prior Publication Data

US 2023/0127851 A1 Apr. 27, 2023

(51) Int. Cl.
*B62D 33/06* (2006.01)
*B62D 33/02* (2006.01)

(52) U.S. Cl.
CPC ............. *B62D 33/06* (2013.01); *B62D 33/02* (2013.01)

(58) Field of Classification Search
CPC .......... B62D 33/02; B62D 33/06; B60D 5/00; B60D 5/003
USPC .............................................. 296/34.43, 166
See application file for complete search history.

(56) References Cited

U.S. PATENT DOCUMENTS

| | | | | |
|---|---|---|---|---|
| 3,638,991 A * | 2/1972 | Hathaway, Jr. | ........... | B60P 3/36 296/166 |
| 3,837,700 A * | 9/1974 | Van Slyke | ................ | B60P 3/32 49/477.1 |
| 4,157,201 A * | 6/1979 | Collins | ..................... | B60P 3/32 296/156 |
| 4,222,605 A * | 9/1980 | Engelhard | .............. | B62D 27/06 52/393 |
| 4,257,645 A * | 3/1981 | Balogh | ..................... | B60P 3/32 49/490.1 |
| 4,279,426 A * | 7/1981 | Flack, Jr. | ................. | F16J 15/52 277/630 |
| 4,480,868 A * | 11/1984 | Koto | .................... | B60N 2/3095 297/335 |
| 4,492,384 A * | 1/1985 | Herschelman | ......... | B60D 5/006 277/637 |
| 4,848,832 A * | 7/1989 | Starnes | .................... | B60P 3/32 296/190.11 |
| 4,940,278 A * | 7/1990 | LePere | ..................... | B60P 3/32 296/166 |
| 5,280,984 A * | 1/1994 | Paul | ..................... | B62D 47/025 296/190.02 |
| 5,301,997 A * | 4/1994 | Cudden | ................. | B62D 47/00 296/193.04 |

(Continued)

OTHER PUBLICATIONS

How To Remove & Install Your Jeep Wrangler Soft Top, https://www.northgatechryslerdodgejeep.net/how-to-remove-install-jeep-wrangler-soft-top.htm, Oct. 2021.

(Continued)

*Primary Examiner* — Jason S Morrow
(74) *Attorney, Agent, or Firm* — Global IP Counselors, LLP

(57) ABSTRACT

A vehicle includes a vehicle frame and a vehicle body. The vehicle body is supported on the vehicle frame. The vehicle body has a cabin and a cargo box. The cabin houses one or more vehicle seats of the vehicle. The cabin has a rear wall and the cargo box has a front wall that is adjacent to the rear wall. The rear wall of the cabin and the front wall of the cargo box together define a passthrough that connects a floor of the cargo box and a floor of the cabin. The passthrough is closeable by a barrier.

19 Claims, 11 Drawing Sheets

(56) References Cited

U.S. PATENT DOCUMENTS

| | | | | |
|---|---|---|---|---|
| 5,924,762 | A * | 7/1999 | Pols | B60P 3/36 |
| | | | | 49/477.1 |
| 5,934,727 | A * | 8/1999 | Storc | B62D 33/0273 |
| | | | | 296/26.11 |
| 6,398,291 | B1 * | 6/2002 | Reusswig | B60N 2/882 |
| | | | | 296/183.1 |
| 6,505,872 | B2 * | 1/2003 | Hong | B60P 7/135 |
| | | | | 296/37.16 |
| 7,014,251 | B1 * | 3/2006 | Husk | B60J 1/1853 |
| | | | | 277/630 |
| 7,246,847 | B2 * | 7/2007 | Polewarczyk | B60J 5/00 |
| | | | | 296/190.11 |
| 7,566,094 | B2 * | 7/2009 | Polewarczyk | B60J 1/1861 |
| | | | | 296/190.11 |
| 10,350,972 | B2 * | 7/2019 | Azzouz | B60J 5/00 |
| 2022/0177052 | A1 * | 6/2022 | Harmon | B60P 3/341 |

OTHER PUBLICATIONS

Accordion Boot, https://www.accordionboot.com/?gclid=CjwKCAjw7--KBhAMEiwAxfpkWNb-y6cZH8rUei1fAMpESdTuQbbKDv15_itzsdD44yIQwfENaGq8NRoCsj8QAvD_BwE, Oct. 2021.

* cited by examiner

VEHICLE

BACKGROUND

Technical Field

The present disclosure generally relates to a vehicle. More specifically, the present disclosure relates to a vehicle having a body-on-frame construction.

Background Information

Conventionally, body-on-frame sports utility vehicles (SUVs) are preferred for off-roading and towing. Body-on-frame SUVs can be more rugged, meaning the chassis of the vehicle is separated, but bolted to a steel frame by which the engine, wheels, suspension are attached. Body-on-frame SUVs can have extendable vehicle frames, with some being provided in multiple sizes and shapes.

SUMMARY

In view of the state of the known technology, one aspect of the present disclosure is to provide a vehicle comprising a vehicle frame and a vehicle body. The vehicle body is supported on the vehicle frame. The vehicle body has a cabin and a cargo box. The cabin houses one or more vehicle seats of the vehicle. The cabin has a rear wall and the cargo box has a front wall that is adjacent to the rear wall. The rear wall of the cabin and the front wall of the cargo box together define a passthrough that connects a floor of the cargo box and a floor of the cabin. The passthrough is closeable by a barrier.

BRIEF DESCRIPTION OF THE DRAWINGS

Referring now to the attached drawings which form a part of this original disclosure.

DETAILED DESCRIPTION OF EMBODIMENTS

Figure 1:
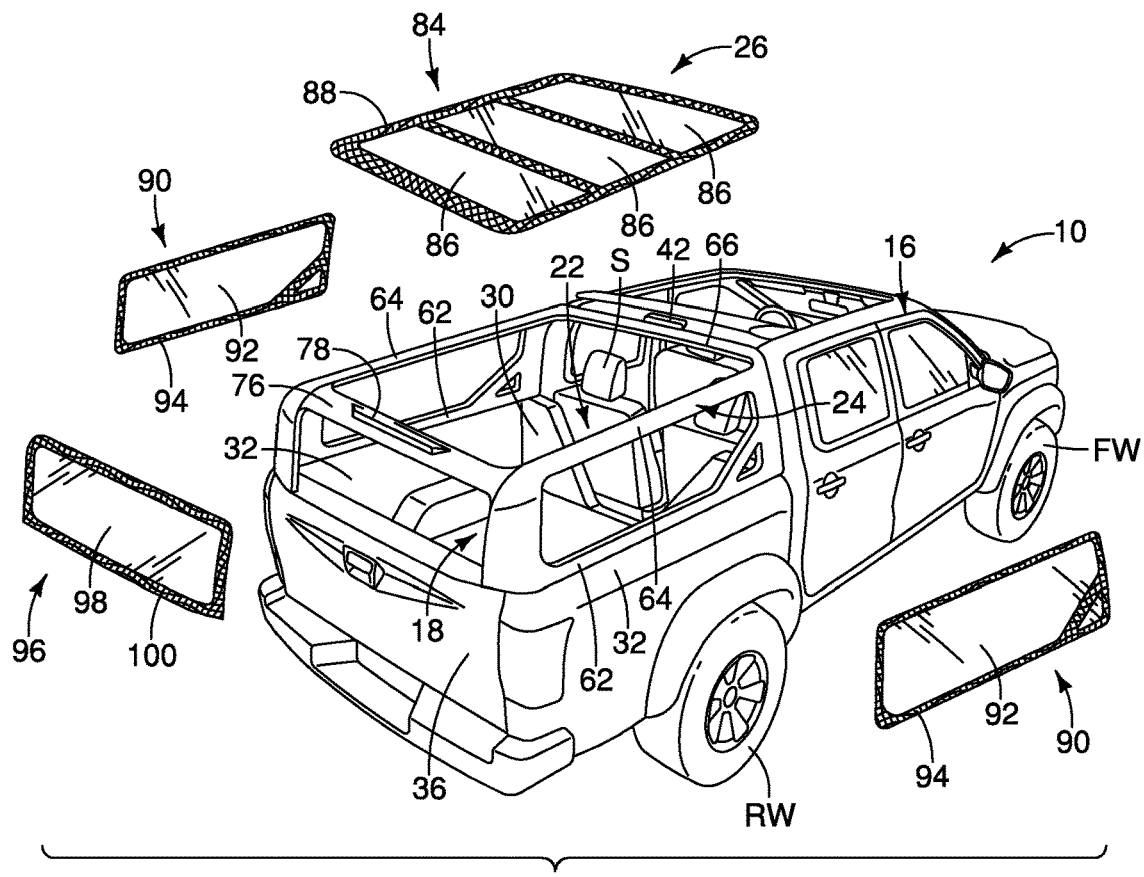
FIG. 1 is a rear perspective view of an vehicle that can be converted from an open-air state to an enclosed state.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 5, a vehicle 10 comprises a vehicle frame 12 and a vehicle body 14. The vehicle 10 also includes front and rear wheels FW and RW that are supported by the vehicle frame 12, best seen in FIG. 3. The vehicle body 14 has a cabin 16 and a cargo box 18. The vehicle body 14 defines a basic "skeleton" of the vehicle 10 that forms the cabin 16, an engine bay E, and the cargo box 18. As shown, the vehicle body 14 is supported on the vehicle frame 12. The vehicle frame 12 is a chassis made of high-durable steel to form a strong, flat frame, which supports the weight of the vehicle 10. The vehicle frame 12 also supports vehicle's 10 suspension with the front and rear wheels FW and RW. Therefore, the vehicle 10 of the illustrated embodiment has a body-on-frame construction.

The vehicle 10 of the illustrated embodiment is a pick-up truck which is a light-duty truck having the enclosed cabin 16 and the cargo box 18 (or truck bed). As seen in FIGS. 4 to 7, the cabin 16 houses one or more vehicle seats S of the vehicle 10 that sit on a floor of the cabin 16. The cargo box 18 is sized and configured for cargo storage. As the vehicle 10 of the illustrated embodiment has a body-on-frame construction, the cabin 16 and the cargo box 18 are separately mounted on the vehicle frame 12. That is, the cabin 16 is a separate piece from the cargo box 18 and the cabin 16 and the cargo box 18 are independently mounted to the vehicle frame 12, as will be further described below.

Figure 9:
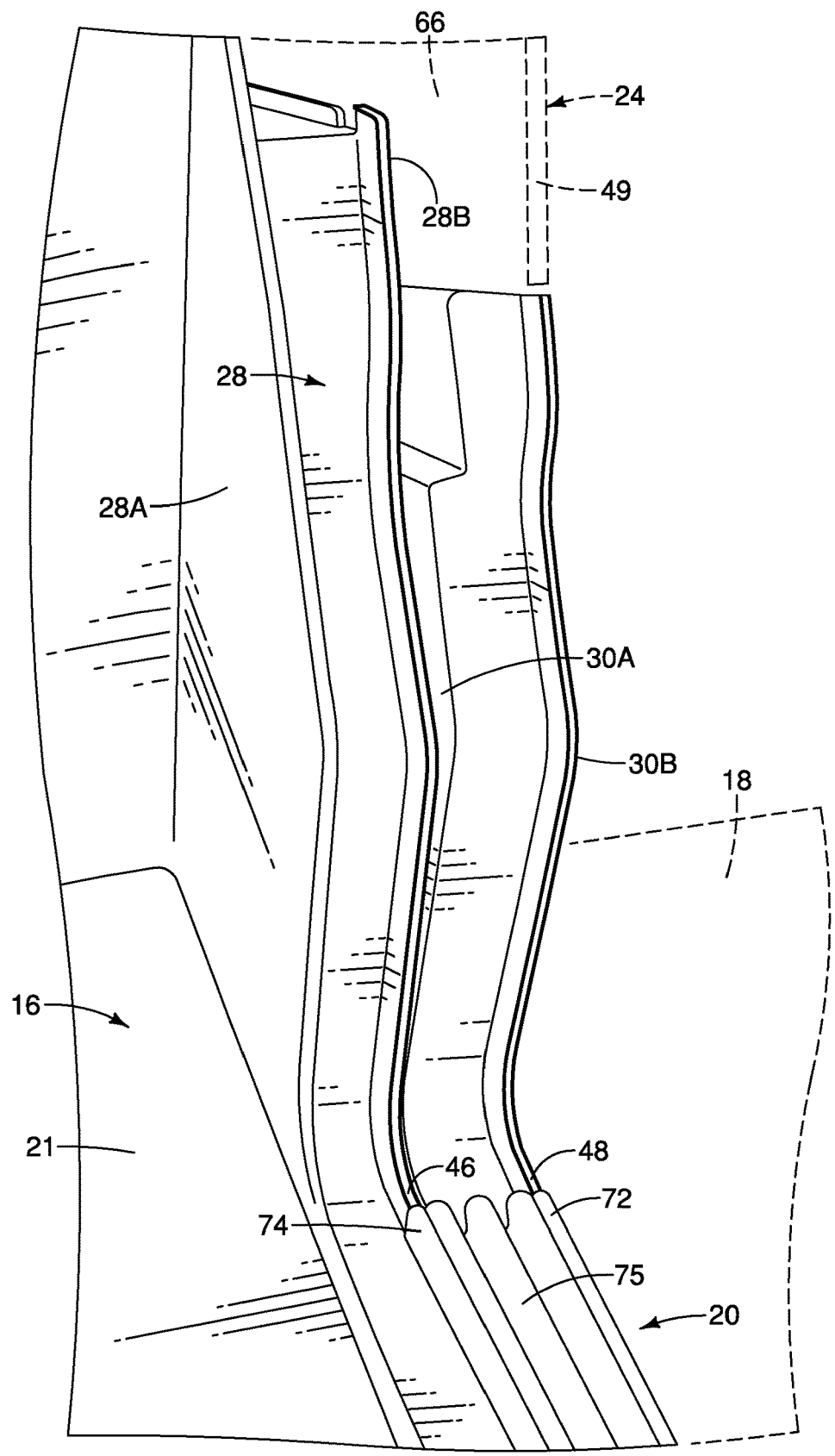
FIG. 9 is an enlarged view of a rear wall of the cabin and a front wall of the cargo box being applied with the elastic seal.

In the illustrated embodiment, the vehicle 10 further comprises an elastic seal 20. The cabin 16 and the cargo box 18 are movably connected by the elastic seal 20. In particular, the cabin 16 and the cargo box 18 are separated by a gap G, as seen in FIG. 9. The elastic seal 20 movably connects the cabin 16 and the cargo box 18 and covers the gap G, as will be further discussed below.

As best seen in FIGS. 4 to 7, the vehicle 10 includes a passthrough 22 that connects the cabin 16 and the cargo box 18. The passthrough 22 is sized and dimensioned for a driver or a passenger to pass easily from the cabin 16 to the cargo box 18 as needed and/or desired. The passthrough 22 has an outer border that is covered by the elastic seal 20. The elastic seal 20 forms a weather-tight flexible seal around the entire perimeter of the passthrough 22. The cabin 16 and the cargo box 18 therefore moves and flexes independently at the passthrough 22 via the elastic seal 20 and enables the vehicle to have movement like a heavy-duty truck.

Figure 2:
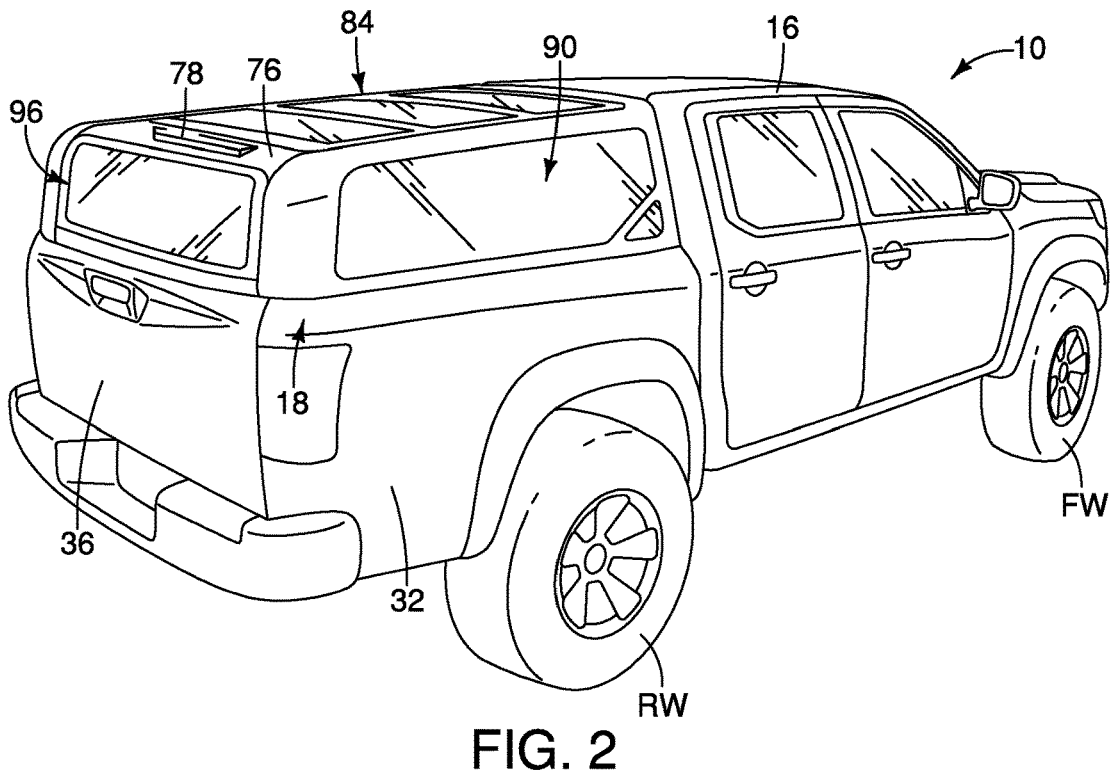
FIG. 2 is a rear perspective view of the vehicle in the enclosed state.
Figure 3:
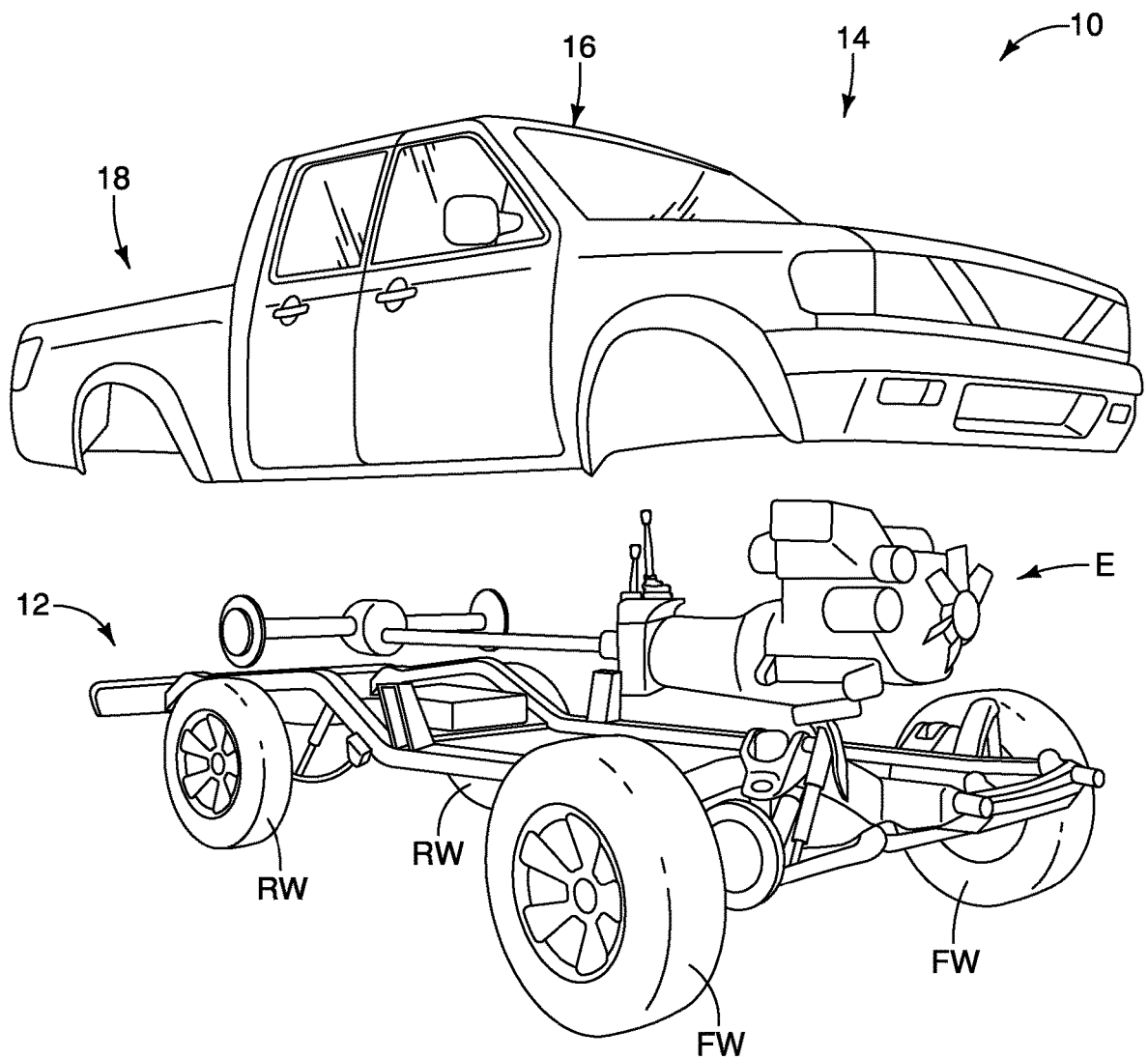
FIG. 3 is an exploded view of the vehicle body of the vehicle and the vehicle frame of the vehicle.
Figure 4:
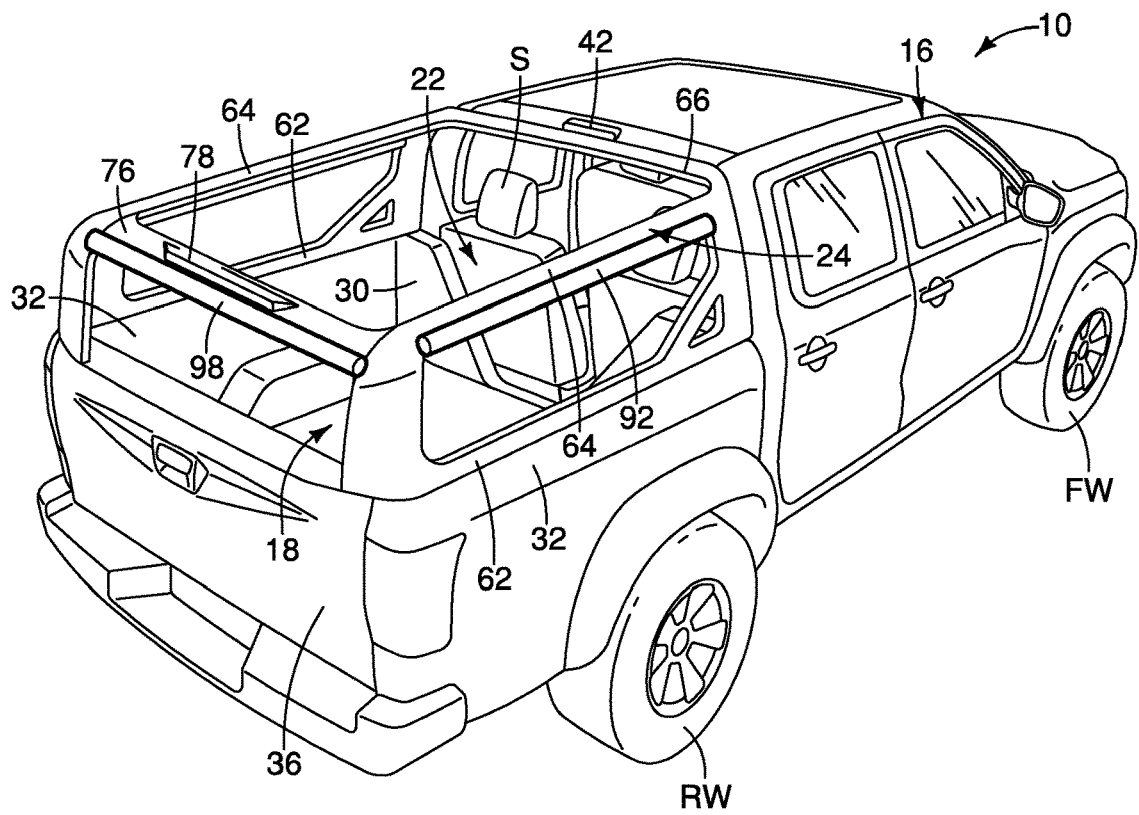
FIG. 4 is a rear perspective view of the vehicle having soft top panels that are opened.
Figure 5:
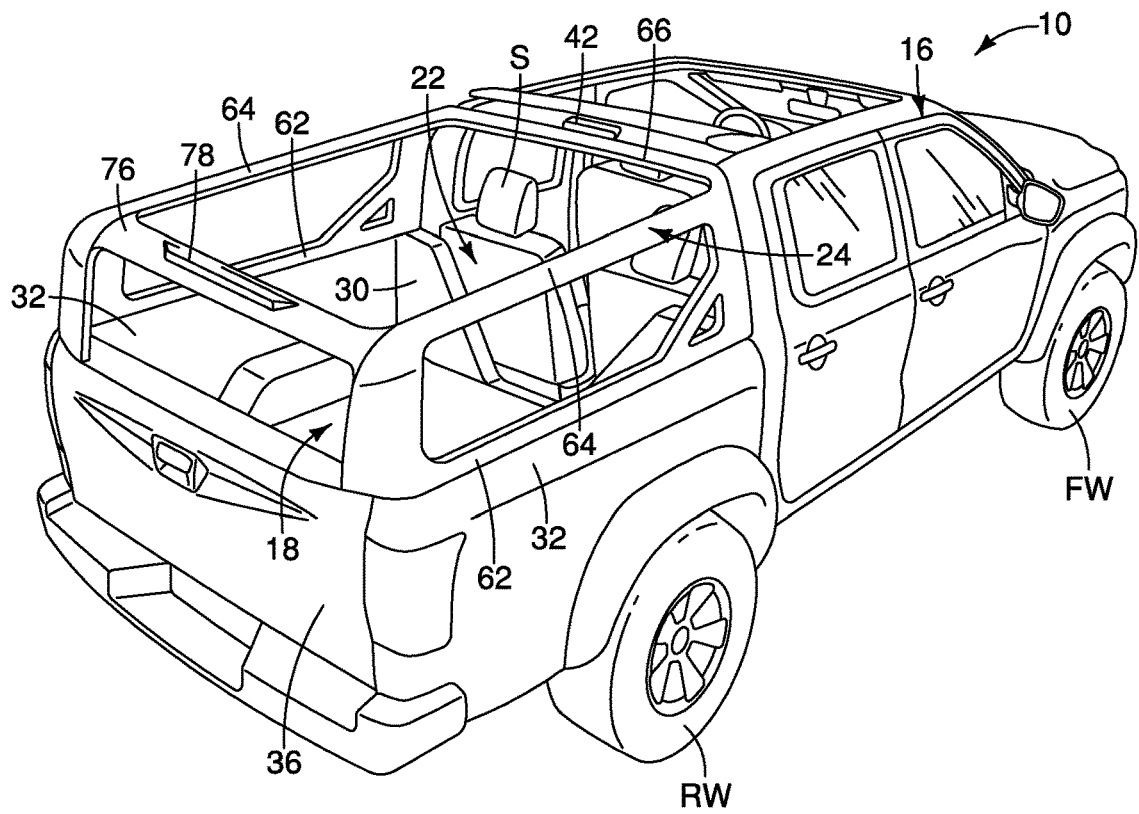
FIG. 5 is a rear perspective view of the vehicle in the open-air state.

As seen in FIGS. 1, 4 and 5, the vehicle 10 includes a cargo box frame 24 that is installed onto the cargo box 18. The cargo box frame 24 forms a roof skeleton for the cargo box 18 that allows the vehicle 10 to have an outer shape like a sports utility vehicle (SUV). As seen in FIGS. 1, 2 and 4, the vehicle 10 further includes a plurality of soft top panels 26 that are removably attached to the cargo box frame 24, as will be further discussed below. When the soft top panels 26 are installed to the cargo box frame 24, the cargo box 18 can be enclosed. The installation of the cargo box frame 24 with the soft top panels 26 enables the vehicle 10 to alternatively function as an open-air vehicle and an enclosed vehicle. That is, the vehicle 10 of the illustrated embodiment can alternate between an open-air truck and a SUV.

Figure 8:
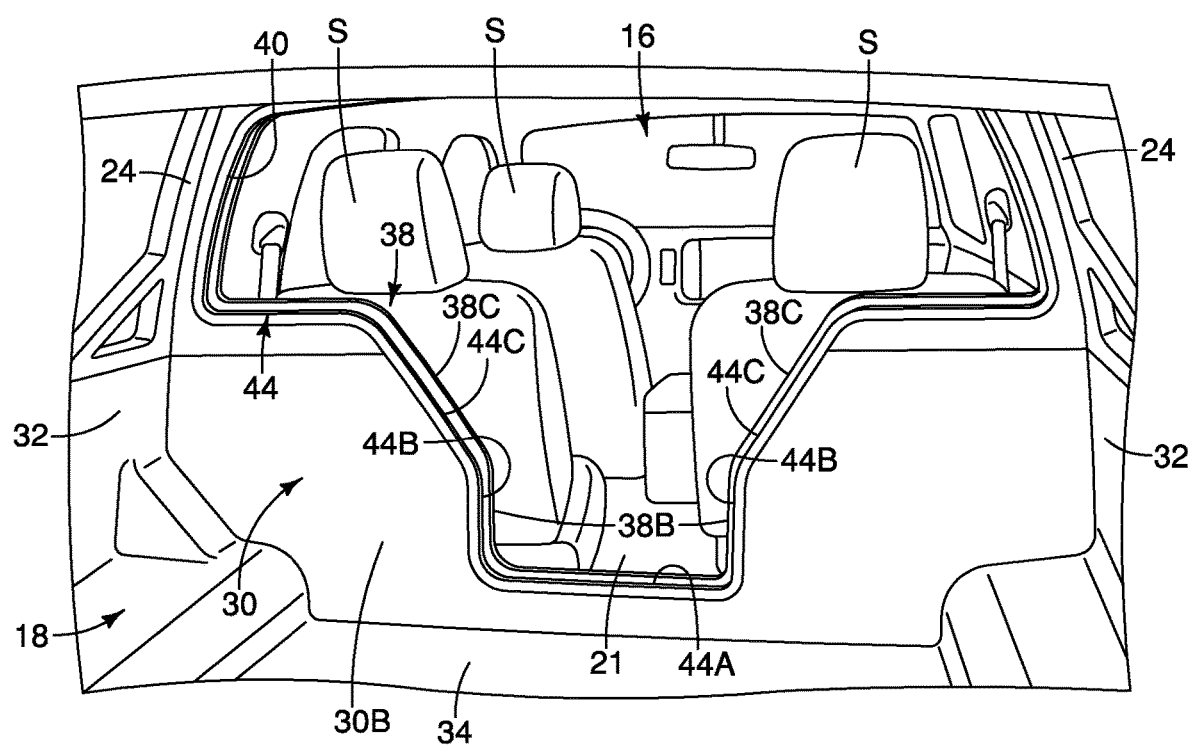
FIG. 8 is an interior view of the vehicle showing the cabin and the cargo box prior to attachment by an elastic seal.

As best seen in FIGS. 8 and 9, the cabin 16 has a rear wall 28 that extends upwards from a floor 21 of the cabin 16. The rear wall 28 partially defines the passthrough 22. The rear wall 28 includes a front side 28A and a rear side 28B. The front side 28A faces a vehicle forward direction (i.e., towards the front of the vehicle 10) and the rear side 28B faces the vehicle rearward direction (i.e., towards the rear or tail of the vehicle 10). The rear wall 28 is made of sheet metal that is movably attached to the cargo box 18 by the elastic seal 20. As the cabin 16 can flex with respect to the cargo box 18, cabin 16 can avoid body damage when the cargo carries a large payload.

As also seen in FIGS. 8 and 9, the cargo box 18 includes a front wall 30 that is adjacent to the rear wall 28 of the cabin 16. The cargo box 18 further includes a pair of sidewalls 32, a floor 34, and a tailgate 36. The tailgate 36 is movable between an open and a closed position to enable access to the cargo box 18 from the rear of the vehicle 10. In the illustrated embodiment, the rear wall 28 of the cabin 16 and the front wall 30 of the cargo box 18 together define the passthrough 22. The passthrough 22 connects the floor 34 of the cargo box 18 and the floor 21 of the cabin 16. The passthrough 22 enables the vehicle rider to easily step from the floor 21 of the cabin 16 to the floor 34 of the cargo box 18 and vice versa. The front wall 30 includes a front side 30A and a rear side 30B. The front side 30A of the front wall 30 faces the rear side 28B of the rear wall 28 of the cabin 16.

As stated, the cabin 16 and the cargo box 18 are separately mounted onto the vehicle frame 12 so that the cabin 16 and the cargo box 18 can flex with respect to each other via the elastic seal 20. In particular, the rear wall 28 of the cabin 16 is cut by metal cutting tools, such as a pneumatic sheers, grinder and/or a metal nibbler. As best seen in FIG. 8, the rear wall 28 is cut to have a rear wall opening 38. The rear wall opening 38 has a bottom portion 38A, a pair of first side portions 38B that extend upward from the bottom portion 38A, and a pair of second side portions 38C that extend upward from the first side portions 38B. The second side portions 38C extend into a preexisting window 40 of the rear cabin 16.

As best seen in FIGS. 4, 5 and 8, the bottom portion 38A preferably has a width that corresponds substantially to a width of a space between the seats S of the cabin 16 to allow easy passage of a passenger from the cabin 16 to the cargo box 18 and vice versa. The first side portions 38B extend perpendicularly from the bottom portion 38A and extend into the second side portions 38C. The second side portions 38C extend upwards and laterally towards the sides of the vehicle 10.

Therefore, the second side portions 38C has an expanding width with a maximum width that is greater than the width of the bottom portion 38A. Together, the bottom portion 38A, the first side portions 38B and the second side portions 38C partially define the outer border 22A of the passthrough 22. However, it will be apparent to those skilled in the vehicle field from this disclosure that the passthrough 22 can have different shapes of different dimensions by cutting the rear wall 28 of the cabin 16 in different patterns.

As also seen in FIGS. 4 and 5, the rear wall 28 of the cabin 16 preferably includes a first rear light 42 of the vehicle 10. The first rear light 42 is installed onto a top edge of the window 40. The first rear light 42 serves as a taillight, braking light or a warning light of the vehicle 10.

Referring to FIGS. 8 and 9, the front wall 30 of the cargo box 18 is cut by metal cutting tools to have a front wall opening 44 that substantially corresponds to (lines up with) the rear wall opening 38 of the cabin 16. The front wall opening 44 therefore has a bottom portion 44A, a pair of first side portions 44B that extend upwards from the bottom portion, and a pair of second side portions 44C that extend upwards from the first side portions 44B. The bottom portion 44A, the first side portions 44B and the second side portions 44C of the front wall 30 correspond with the size and dimensions of the bottom portion 38A, the first side portions 38B and the second side portions 38C of the rear wall 28 of the cabin 16. Therefore, together, the bottom portion 44A, the first side portions 44B and the second side portions 44C partially define the outer border 22A of the passthrough 22.

In the illustrated embodiment, the vehicle body 14 is the vehicle body 14 of a pickup truck in which the cabin 16 and the cargo box 18 are cut to be two separate members. However, it will be apparent to those skilled in the vehicle field from this disclosure that the cabin 16 and the cargo box 18 can alternatively be manufactured as separated pieces having an opening on the rear wall 28 of the cabin 16 and an opening on the front wall 30 of the cargo to have a passthrough 22 between the cabin 16 and the cargo box 18.

As seen in FIGS. 8 and 9, the rear wall 28 of the cabin 16 includes a first flange 46 that extends along the perimeter of the rear wall opening 38. In particular, the rear side 28B of the rear wall 28 includes the first flange 46. The front wall 30 of the cargo box 18 includes a second flange 48 that extends along the perimeter of the front wall opening 44. In particular, the rear side of the front wall 30 includes the second flange 48. The elastic seal 20 is provided onto the first and second flanges 46 and 48, as will be discussed below. In the illustrated embodiment, the first and second flanges 46 and 48 can be welded onto the rear wall 28 and the front wall 30, respectively. Alternatively, the cabin 16 and the cargo box 18 can be separately made to have the first and second flanges 46 and 48 pre-installed thereon.

Figure 7:
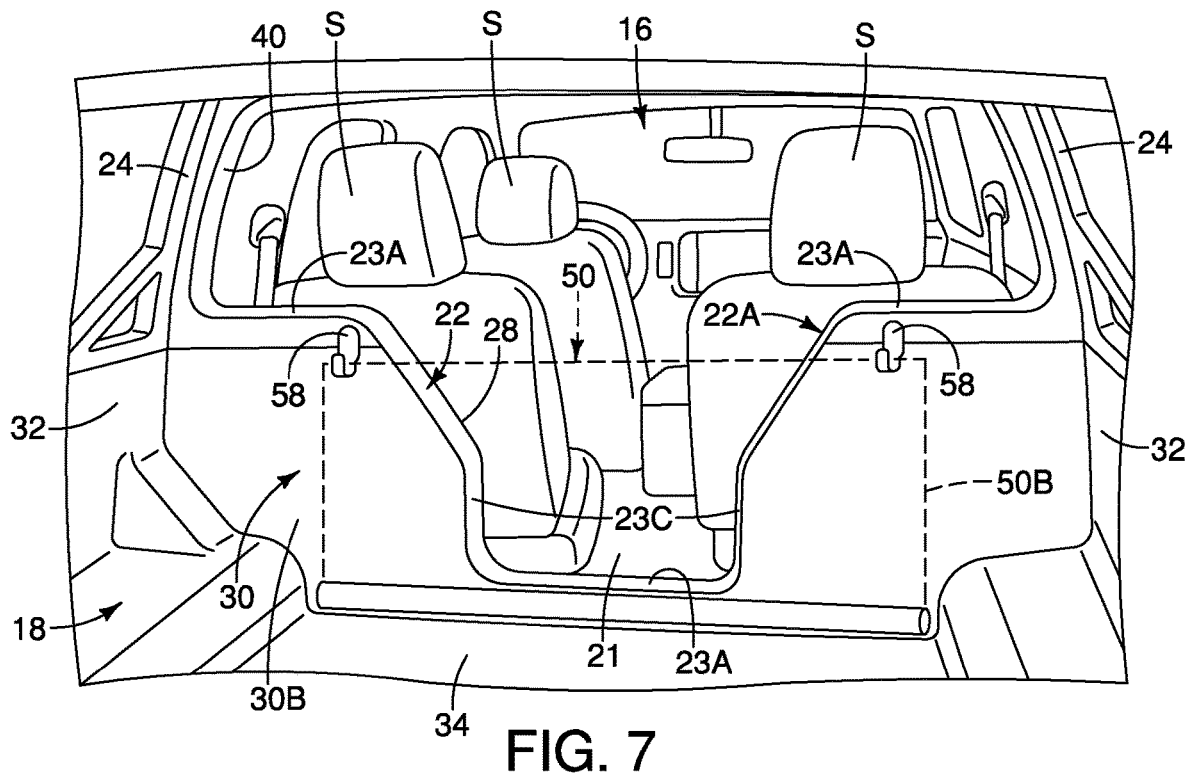
FIG. 7 an interior view similar to FIG. 6 showing a second barrier covering the passthrough.

As best seen in FIGS. 7 and 8, the 22A outer border of the passthrough 22 includes a top side 23A, a bottom side 23B, and a pair of lateral sides 22C that connect the top and bottom sides. The top side of the passthrough 22 is defined by the rear wall 28 of the cabin 16 and the cargo box frame 24. The bottom side of the passthrough 22 is defined by the rear wall 28 of the cabin 16 and the front wall 30 of the cargo box 18.

Figure 6:
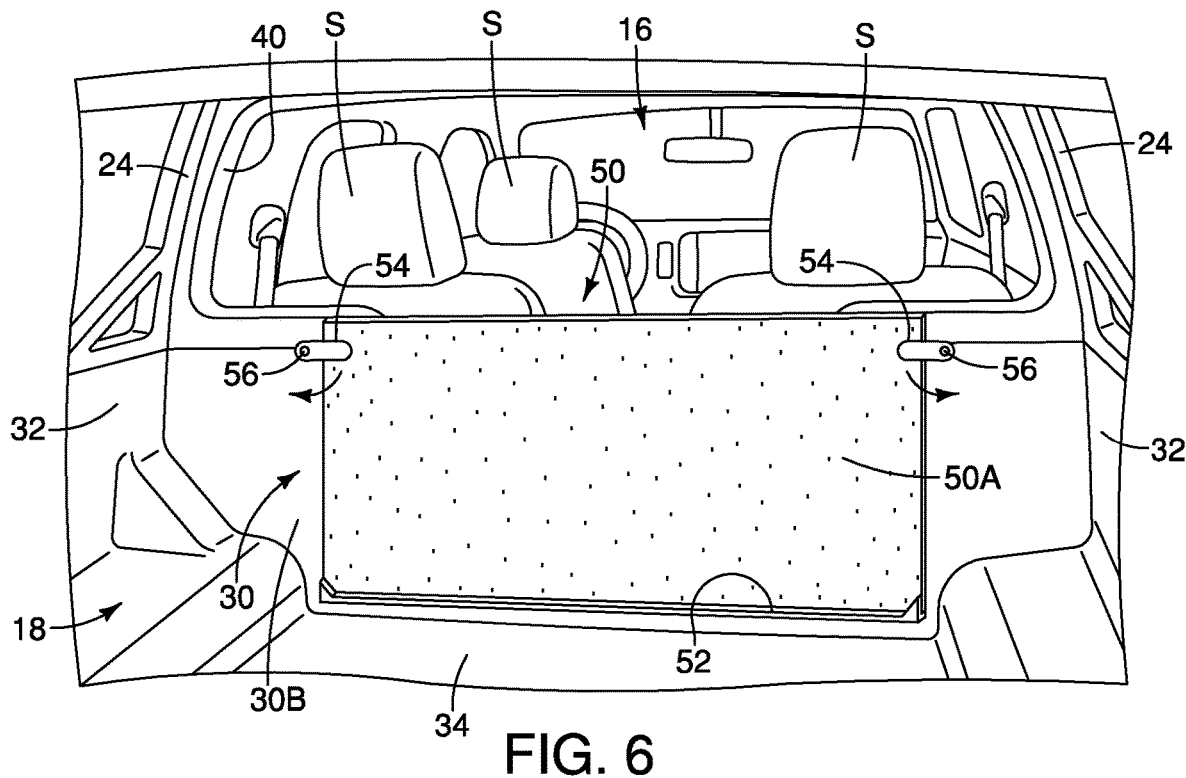
FIG. 6 an interior view of the vehicle equipped with a first barrier covering a passthrough between a cabin and a cargo box of the vehicle.

Referring to FIGS. 6 and 7, the vehicle 10 further includes a barrier 50 that is provided over the passthrough 22 as needed and/or desired. That is, the passthrough 22 is closeable by the barrier 50. In particular, the barrier includes a first barrier 50A (FIG. 6) and a second barrier 50B (FIG. 7). The first and second barriers 50A and 50B are both movable between a stowed position and an operating position.

Referring to FIG. 6, the first barrier 50A is a rigid barrier that can be made of plastic that is erected to block the passthrough 22. That is, the first barrier 50A overlaps with the passthrough 22 when in the operating position. For example, the vehicle 10 can include a slot 52 on the floor 34 of the cargo box 18 to support the first barrier 50A in the operating position. The first barrier 50A can be stowed on the floor 34 of the cargo box 18 in the stowed position. Therefore, the first barrier 50A is offset of the passthrough 22 in the stowed position.

As shown, the front wall 30 of the cargo box 18 includes a pair of retainers 54 that pivot along a pair of hinges 56 to retain the first barrier 50A on the front wall 30. The retainers 54 can be operated by the user to release the first barrier 50A or to hold the first barrier 50A in the operating position. While the retainers 54 and the first barrier 50A are illustrated as being supported on the front wall 30, it will be apparent to those skilled in the vehicle field from this disclosure that the retainers 54 and the first barrier 50A can alternatively be provided on the rear wall 28 of the cabin 16 to retain the first barrier 50A inside the cabin 16. Further, it will be apparent to those skilled in the vehicle field from this disclosure that floor of the cabin 16 can include a slot to retain the first barrier 50A inside the cabin 16.

As seen in FIG. 7, the second barrier 50B is additionally or alternatively provided to the vehicle 10 along with the first barrier 50A. The second barrier 50B is made of a deformable material such as vinyl, fabric or canvas material. Preferably, the second barrier 50B is rolled up in the stowed position. The second barrier 50B is unrolled in the operating position. The second barrier 50B is erected to block the passthrough 22 in the operable position. The second barrier 50B overlaps with the passthrough 22 to block the passthrough 22 in the operating position. The second barrier 50B is offset of the passthrough 22 in the stowed position.

As shown, the front wall 30 of the cargo box 18 includes a pair of hooks 58 that can engage with corresponding hooks 58 (not shown) of the second barrier 50B to retain the second barrier 50B in the operating position. While the hooks 58 and the second barrier 50B are being illustrated as being supported on the front wall 30, it will be apparent to those skilled in the vehicle field from this disclosure that the hooks 58 and the second barrier 50B can alternatively be provided on the rear wall 28 of the cabin 16 to retain the second barrier 50B inside the cabin 16. Therefore, in the illustrated embodiment, at least one of the front wall 30 of the cargo box 18 and the rear wall 28 of the cabin 16 includes one or more fasteners for maintaining the barrier in the operable position.

Referring to FIGS. 4, 5 and 13 to 16, the cargo box frame 24 is fixedly mounted to the cargo box 18. The cargo box frame 24 is made of a durable, rigid material such as fiberglass that is molded from several pieces to form a one-piece integrated member that is mounted to the cargo box 18. The cargo box frame 24 preferably includes a plurality of reinforcements 60, such as internal metal inserts 60 that reinforce the structure of the cargo box frame 24. The metal inserts 60 are preferably molded with the fiberglass.

Figure 13:
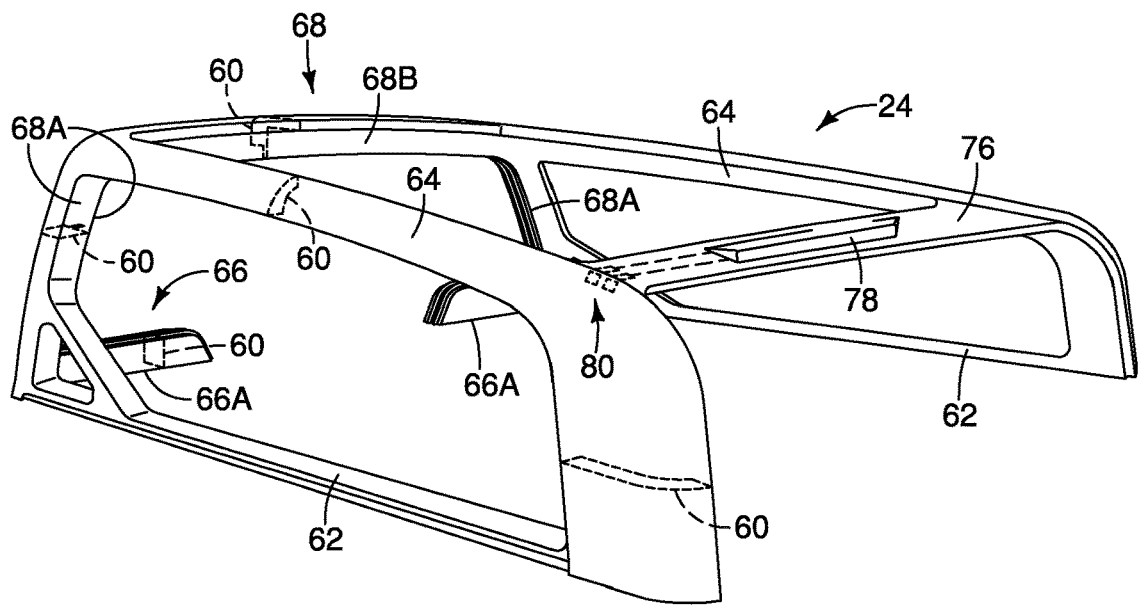
FIG. 13 is a rear perspective view of the cargo box frame.
Figure 14:
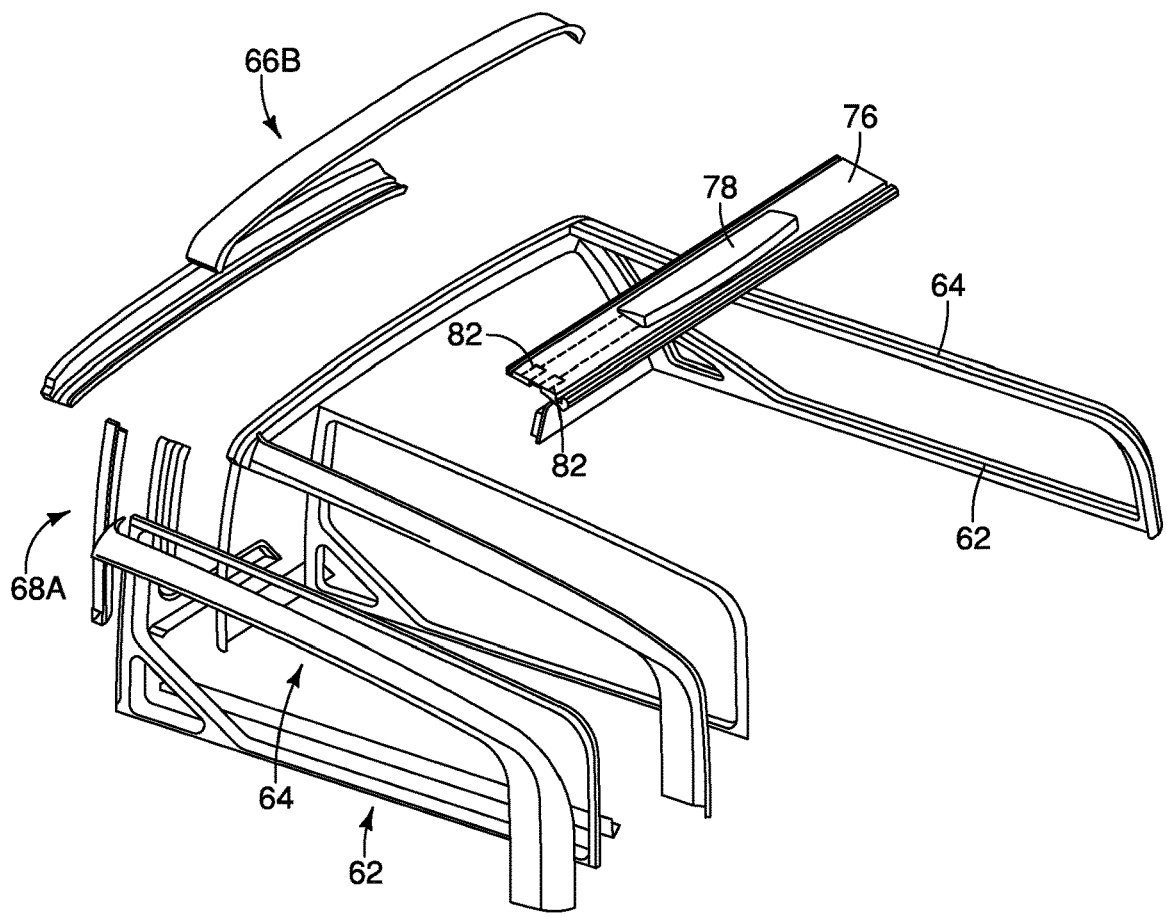
FIG. 14 is an exploded view of portions of the cargo box frame and a rear crossbar for the vehicle.
Figure 15:
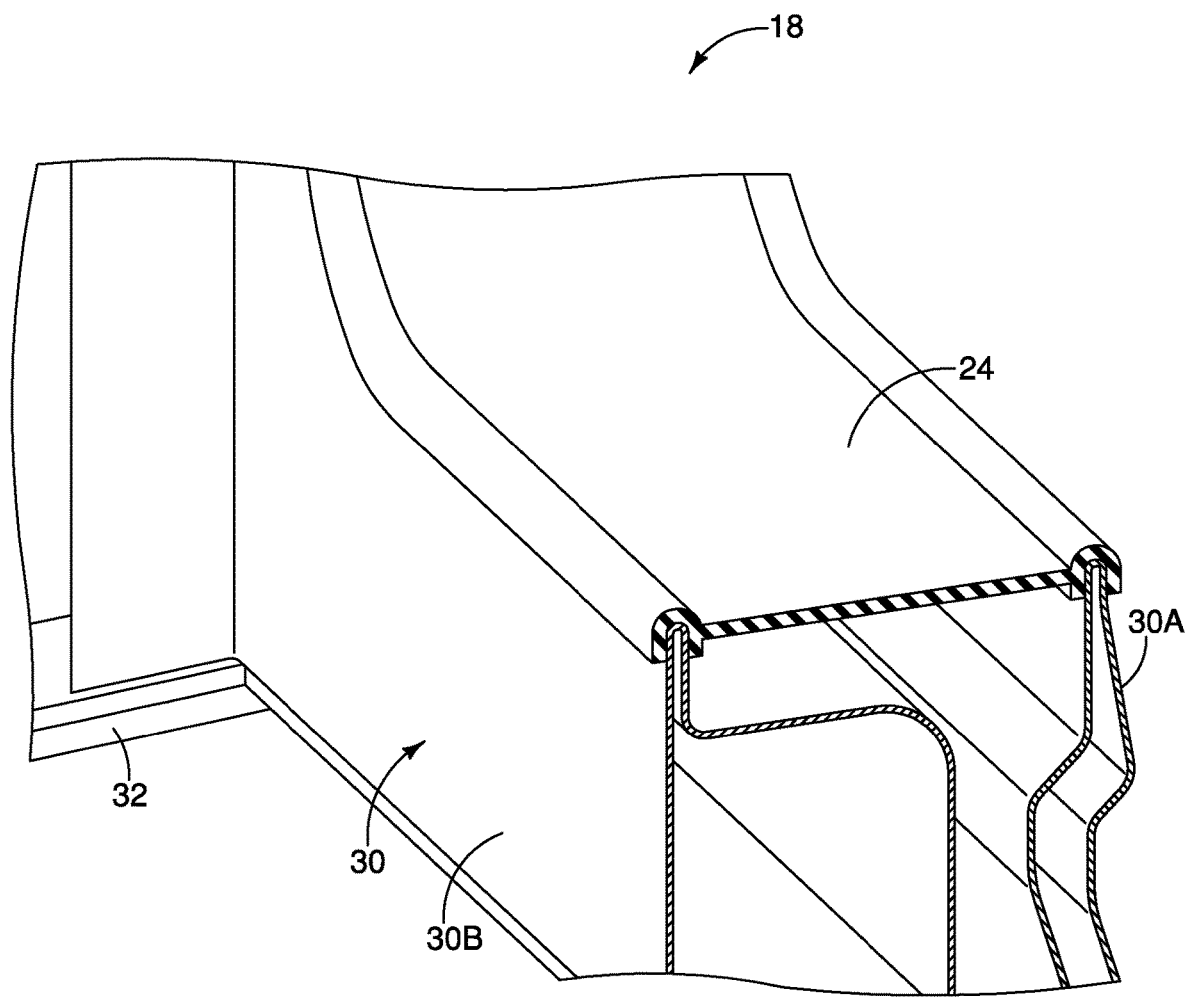
FIG. 15 is an enlarged view of a portion of the cargo box frame mounted to the cargo box.

As seen in FIGS. 13 and 14, the cargo box frame 24 is mounted to the sidewalls 32 of the cargo box 18, preferably by bolts or other types of fasteners as appropriate. In particular, Referring to FIGS. 4, 5 and 13, the cargo box frame 24 has a pair of mounting rails 62 that are mounted to the sidewalls 32 of the cargo box 18. As best seen in FIG. 13, the cargo box frame 24 includes a pair of crossbar siderails 64 extending rearward of the forward border 70. The crossbar siderails 64 extend substantially parallel to the mounting rails 62.

Figure 16:
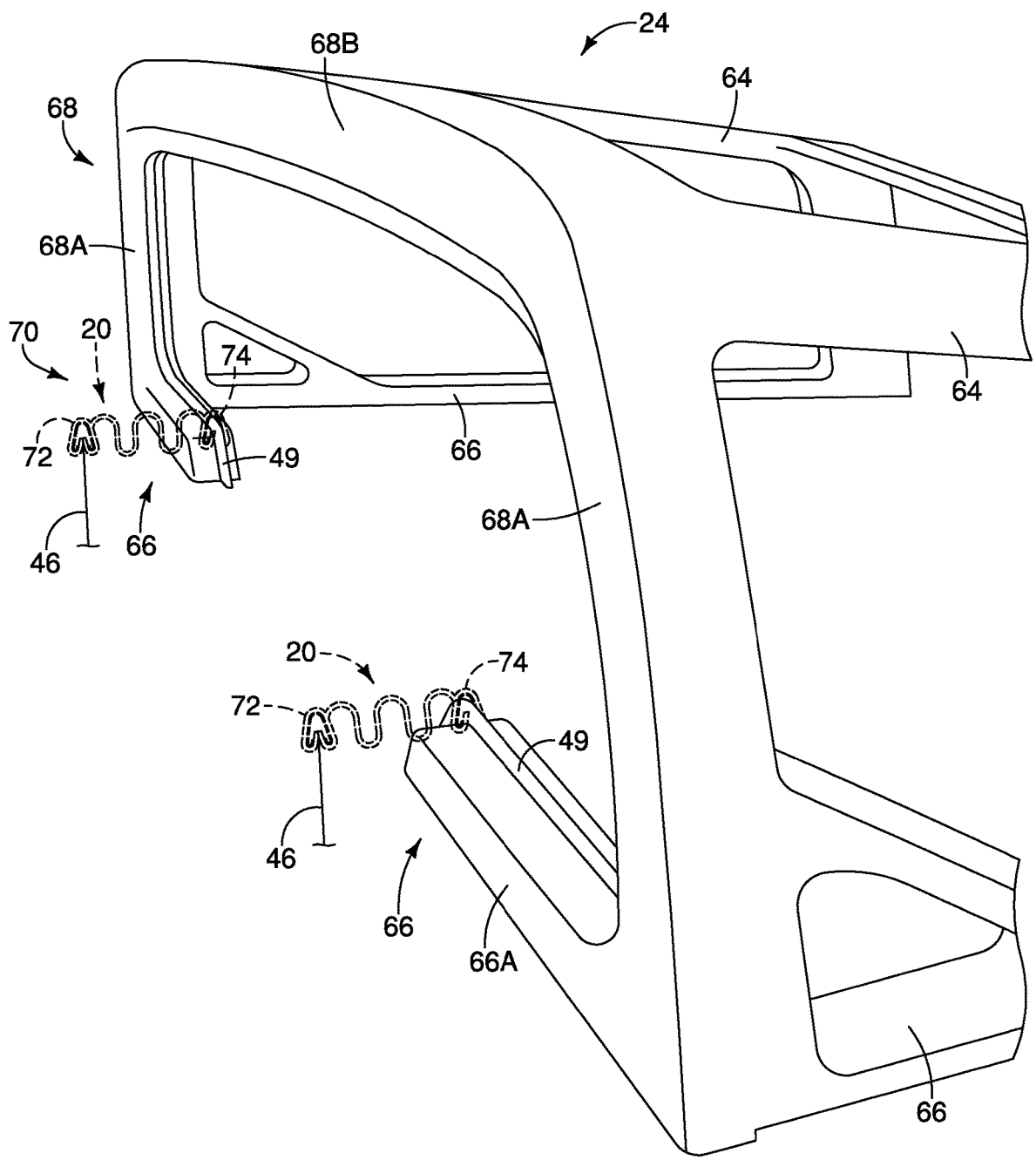
FIG. 16 is a front perspective view as a portion of the cargo box frame.

Referring to FIG. 16, the cargo box frame 24 further has a front wall attachment portion 66 that is attached to the front wall 30 of the cargo box 18. The front wall attachment portion 66 is defined by a pair of front rails 66A extending perpendicularly to the mounting rails 62. The front rails 66A are mounted to the front wall 30 of the cargo box 18, as best seen in FIGS. 8 and 9. The front rails 66A can be mounted to the front wall 30 by bolts or other types of fasteners. Referring back to FIG. 16, the cargo box frame 24 further includes a rear wall attachment portion 68 that is indirectly attached to the rear wall 28 of the cargo box 18 by the elastic seal 20. The rear wall attachment portion 68 includes a pair of upright rails 68A extending upward from the front rails 66A. The rear wall attachment portion 68 further includes a lateral rail 68B connecting the upright rails 68A.

The front wall attachment portion 66 and the rear wall attachment portion 68 of the cargo box frame 24 together have a shape that substantially corresponds to the window 40 and partially corresponds to the passthrough 22, as seen in FIG. 8. Together, the front wall attachment portion 66 and the rear wall attachment portion 68 define a forward border 70 of the cargo box frame 24. That is, the forward border 70 at least partially corresponds to the outer border 22A of the passthrough 22. Thus, the cargo box frame 24 is movably connected to the cabin 16 by the forward border 70 of the cargo box frame 24.

The elastic seal 20 is provided to the forward border 70, as seen in FIG. 14. More specifically, the elastic seal 20 is provided along the forward border 70 of the cargo box frame 24 to movably attach the cargo box frame 24 to the cabin 16. In particular, the upright rails 68A and the lateral rail 68B of the cargo box frame 24 are movably attached to the cabin 16 by the elastic seal 20. The front rails 66A are preferably fixed to the rear wall 28 of the cargo box 18, such as by bolts and fasteners. As stated, the cargo box frame 24 is fixedly mounted to the cargo box 18.

Figure 10:
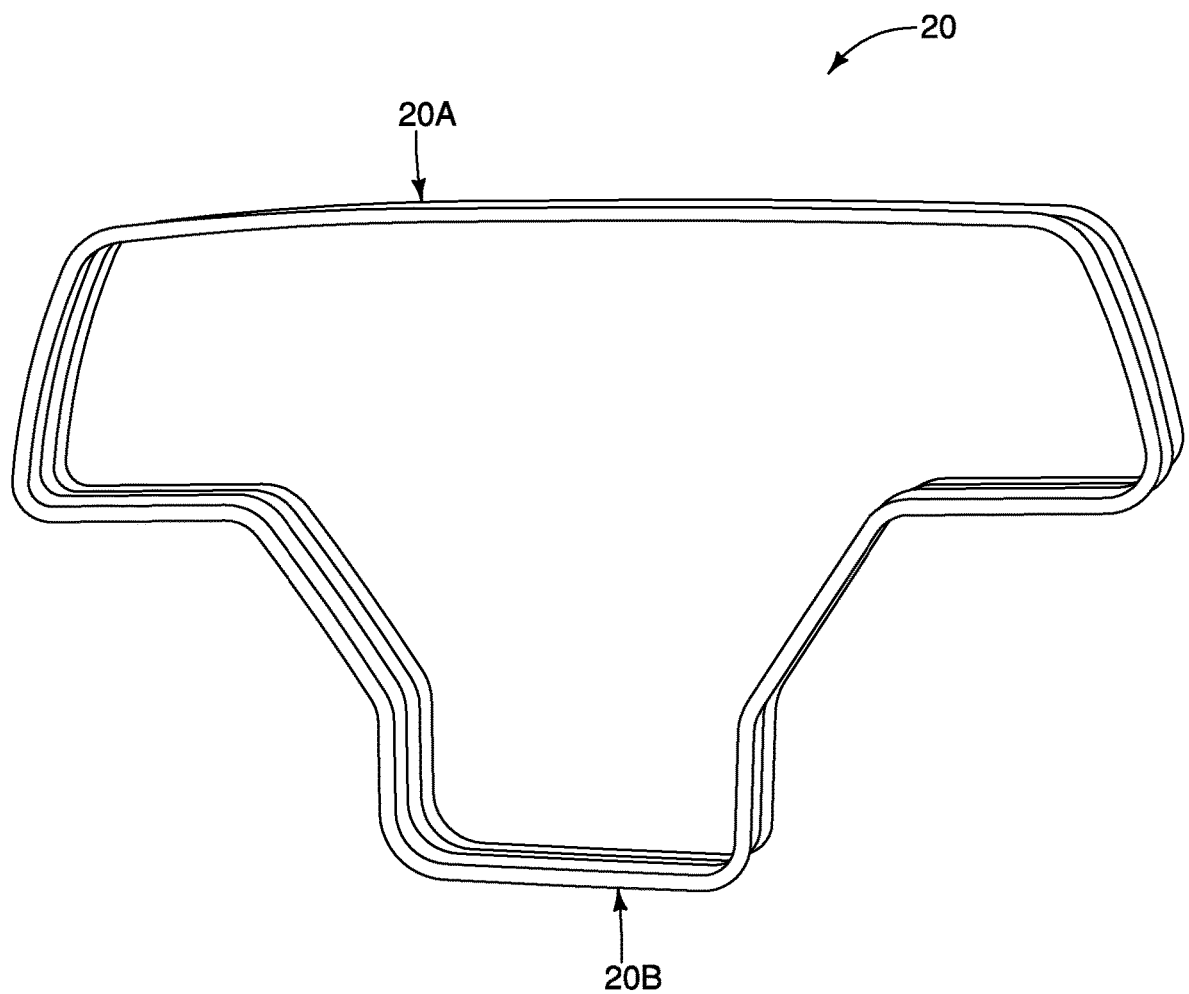
FIG. 10 is a perspective view of the elastic seal.
Figure 11:
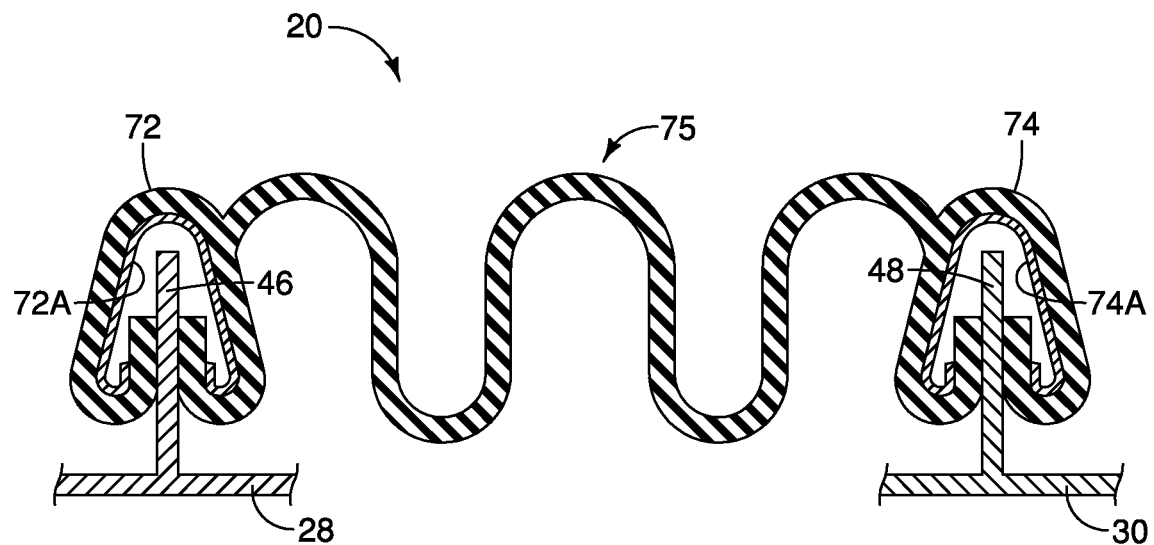
FIG. 11 is a first cross-sectional view of the elastic seal applied to the rear wall of the cabin and the front wall of the cargo box.
Figure 12:
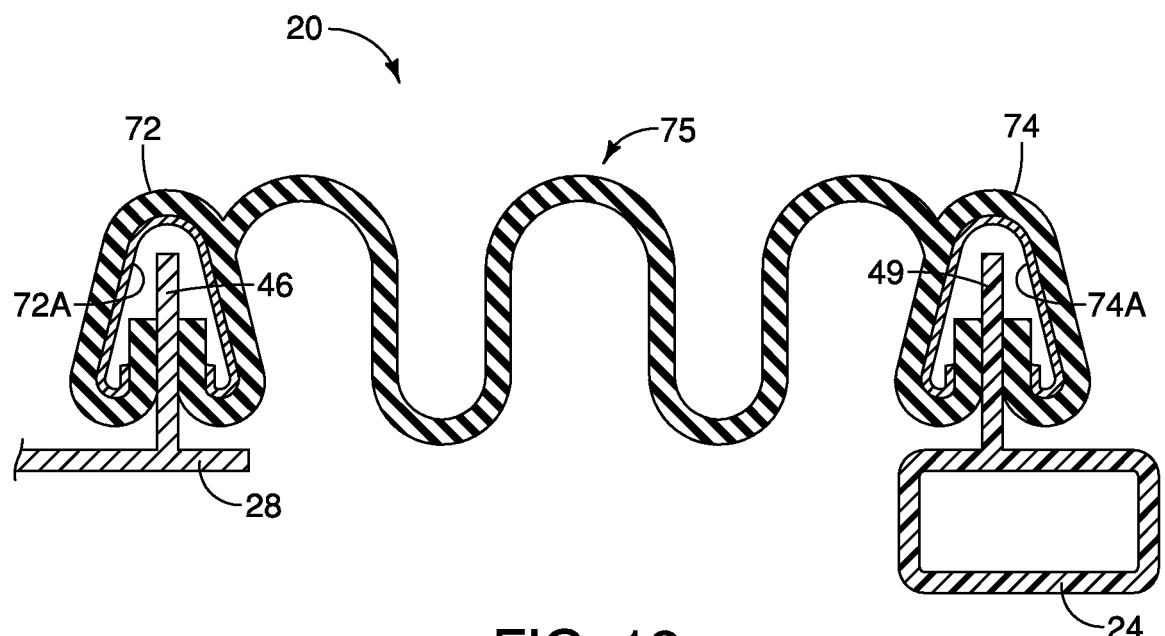
FIG. 12 is a first cross-sectional view of the elastic seal applied to the rear wall of the cabin and a cargo box frame.

Referring to FIGS. 9 to 12 and 16, the elastic seal 20 is preferably made of ethylene propylene diene monomer rubber (EPDM) rubber. As best seen in FIGS. 11 and 12, the elastic seal 20 is configured like an accordion boot seal. Referring to FIG. 10, the elastic seal 20 has an outer border including an upper portion 20A and a bottom portion 20B. The upper portion 20A has a maximum width that is larger than a maximum width of the bottom portion 20B. The upper portion 20A of the elastic seal 20 connects the rear wall 28 of the cabin 16 and the cargo box frame 24. The bottom portion 20B connects the front wall 30 of the cargo box 18 and the rear wall 28 of the cabin 16. As shown, the outer border of the elastic seal 20 partially defines the passthrough 22 along with the rear wall 28 of cabin 16 and the front wall 30 of the cargo box 18.

Referring to FIGS. 9, 11 and 12, the elastic seal 20 includes a first receiving portion 72, a second receiving portion 74 and a corrugated portion 75 extending between the first and second receiving portions 72 and 74. The first receiving portion 72 includes a metal insert 72A that is preferably an internal spring steel loom that enables the first receiving portion 72 to pinch or clamp down on an object (e.g., a metal sheet or panel). The second receiving portion 74 also includes a metal insert 74A that is preferably an internal spring steel loom that enables the second receiving portion 74 to pinch or clamp down on an object (e.g., a metal sheet or panel).

The first flange 46 of the rear wall 28 of the cabin 16 is received by the first receiving portion 72 of the elastic seal 20. Therefore, the first receiving portion 72 receives a portion of the rear wall 28 of the front cabin 16. The second receiving portion 74 of the elastic seal 20 interchangeably receives the front wall 30 of the cargo box 18 and the cargo box frame 24. In particular, the second receiving portion 74 receives the second flange 48 of the front wall 30 of the cargo box 18 at the bottom portion of the elastic seal 20.

The second receiving portion 74 receives the cargo box frame 24 at the top portion of the elastic seal 20. In particular, the second receiving portion 74 receives a flange 49 of the cargo box frame 24 which substantially aligns with the second flange 48 of the front wall 30 when the cargo box frame 24 is mounted to the cargo box 18, as best seen in FIG. 9. In this way, the elastic seal 20 movably connects the cargo box frame 24 and the rear wall 28 of the cabin 16 at the top side of the passthrough 22. The elastic seal 20 movably connects the rear wall 28 of the cabin 16 and the front wall 30 of the cargo box 18 at the bottom side of the passthrough 22.

As seen in FIG. 9, the cabin 16 and the cargo box 18 are separated by the gap G. The elastic seal 20 is disposed over the cabin 16, the cargo box 18 and the gap G to connect the cabin 16 and the cargo box 18. The elastic seal 20 is disposed over sheet metal of the rear wall 28 and sheet metal of the front wall 30. The cabin 16 and the cargo box 18 can flex with respect to each other by the elastic seal 20. In this way, the elastic seal 20 movably connects the cargo box frame 24 to the rear wall 28 of the cabin 16.

Referring to FIGS. 13 and 14, the vehicle 10 further comprises a rear crossbar 76 that is removably attached to each of the crossbar siderails 64. The rear crossbar 76 can be attached to the crossbar siderails 64 by conventional means, such as by sliding the rear crossbar 76 into grooves of the crossbar siderails 64. The rear crossbar 76 can also be fastened to the crossbar siderails 64 by fasteners, such as screws, bolts, etc. The rear crossbar 76 can alternatively be snap fitted or press-fitted to the crossbar siderails 64.

As stated previously, the rear wall 28 of the cabin 16 includes the first rear light 42. The rear crossbar 76 includes a second rear light 78. In the illustrated embodiment, when the rear crossbar 76 is installed, the first and second rear lights 76 and 78 are connected in by the same electrical circuit in parallel. That is, installation of the rear crossbar 76 activates the second rear light 78. As best seen in FIG. 13, one of the crossbar siderails 64 includes an electrical connector that mates with an electrical connector of the rear crossbar 76 when the rear crossbar 76 is connected to the crossbar siderails 64. For example, the crossbar siderail can include an electrical port 80 having a pair of terminals 80A connecting the first and second rear lights 76 and 78 to the electrical circuit. The rear crossbar 76 can include an outlet 82 that mates with the terminals 80A of the crossbar siderail 64 when the rear crossbar 76 is installed.

In the illustrated embodiment, the first and second rear lights 76 and 78 are preferably brake lights or warning lights for the vehicle 10. When the vehicle's 10 brakes are depressed, the electrical circuit is closed such that the first and second rear lights 76 and 78 are illuminated.

Referring back to FIGS. 1 and 2, the vehicle 10 further comprises the soft top panels 26 that are detachably attached to the cargo box frame 24. The soft top panels 26 preferably include vinyl panels that are transparent to form windows for the vehicle 10 when the cargo box 18 is enclosed. The vinyl panels include fabric borders that can be installed to the cargo box frame 24. Installation of the soft top panels 26 to the cargo box frame 24 transforms the vehicle 10 from an open-air vehicle to a closed vehicle as needed and/or desired by the user.

As seen in FIG. 1, the soft top panels 26 includes a roof panel 84 that is detachably attached to the crossbar siderails 64 and the rear crossbar 76. The roof panel 84 can include a plurality of vinyl panels 86 that are bound by fabric borders 88. The fabric borders 88 are attached to the crossbar siderails 64. The soft top panels 26 further includes a plurality of side panels 90. Each of the side panels 90 include with respective vinyl panels 92 having fabric borders 94. The side panels 90 are detachably connected to the crossbar siderails 64 and to the mounting rails 62 of the cargo box frame 24. The soft top panels 26 further include a rear panel 96 having a vinyl panel 98 with a fabric border 100. The rear panel 96 forms a rear window of the vehicle 10 when installed. The rear panel 96 is installed to the rear crossbar 76.

In the illustrated embodiment, each of the roof panel 84, the side panels 90 and the rear panel 96 can be alternatively installed to the cargo box frame 24 as desired. Therefore, the cargo box frame 24 preferably includes channels (such as C-channels) that can receive a rope insert of each of the soft top panels 26 to removably receive the soft top panels 26. The soft top panels 26 can be secured to the cargo box frame 24 and/or the rear crossbar 76 by lock and loop strips. In the illustrated embodiment, the vinyl panels 86, 92 and 98 can be detachable secured to their respective fabric borders 88, 94 and 100 by lock and loop fasteners or zippers. For example, the vinyl panels 86, 92 and 98 can be unzipped and rolled up from the fabric borders 88, 94 and 100 as shown in FIG. 4 so that the vehicle 10 has an open-air configuration.

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle. Accordingly, these terms, as utilized to describe the present invention should be interpreted relative to a vehicle equipped with the vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle comprising:
   a vehicle frame;

a vehicle body that is supported on the vehicle frame, the vehicle body having a cabin and a cargo box, the cabin housing one or more vehicle seats of the vehicle, the cabin having a rear wall and the cargo box having a front wall that is adjacent to the rear wall, the rear wall of the cabin and the front wall of the cargo box together defining a passthrough positioned between a floor of the cargo box and a floor of the cabin, the passthrough being closeable by a barrier, the passthrough including the rear wall of the cabin and the front wall of the cargo box; and an elastic seal, the cabin and the cargo box being movably connected by the elastic seal, the elastic seal extending entirely around a perimeter of the passthrough.

2. The vehicle according to claim 1, further comprising the barrier, the barrier being movable between a stowed position and an operating position, the barrier being offset of the passthrough in the stowed position, the barrier overlapping with the passthrough to block the passthrough in the operating position.

3. The vehicle according to claim 1, wherein the cabin and the cargo box are separately mounted on the vehicle frame.

4. The vehicle according to claim 1, wherein the cabin and the cargo box are separated by a gap, the elastic seal being disposed over the cabin, the cargo box and the gap to connect the cabin and the cargo box.

5. A vehicle comprising:
a vehicle frame;
a vehicle body that is supported on the vehicle frame, the vehicle body having a cabin and a cargo box, the cabin housing one or more vehicle seats of the vehicle, the cabin having a rear wall and the cargo box having a front wall that is adjacent to the rear wall, the rear wall of the cabin and the front wall of the cargo box together defining a passthrough that connects a floor of the cargo box and a floor of the cabin, the passthrough being closeable by a barrier, the cabin and the cargo box are separated by a gap; and
an elastic seal, the cabin and the cargo box being movably connected by the elastic seal, the elastic seal being disposed over the cabin, the cargo box and the gap to connect the cabin and the cargo box,
the elastic seal receives a first flange that is a flange of the rear wall of the cabin and receives a second flange that is a flange of the front wall of the cargo box.

6. The vehicle according to claim 5, wherein the elastic seal is disposed over sheet metal of the rear wall and sheet metal of the front wall.

7. The vehicle according to claim 1, further comprising a cargo box frame that is mounted to a pair of side panels of the cargo box.

8. The vehicle according to claim 7, wherein the passthrough having an outer border including a top side, a bottom side, and a pair of lateral sides that connect the top and bottom sides, the top side of the passthrough being defined by the rear wall of the cabin and the cargo box frame.

9. The vehicle according to claim 8, wherein the bottom side of the passthrough is defined by the rear wall of the cabin and the front wall of the cargo box.

10. The vehicle according to claim 9, wherein the elastic seal movably connects the cargo box frame and the rear wall of the cabin at the top side of the passthrough.

11. The vehicle according to claim 10, wherein the elastic seal movably connects the rear wall of the cabin and the front wall of the cargo box at the bottom side of the passthrough.

12. A vehicle comprising
a vehicle frame;
a vehicle body that is supported on the vehicle frame, the vehicle body having a cabin and a cargo box, the cabin housing one or more vehicle seats of the vehicle,
the cabin having a rear wall and the cargo box having a front wall that is adjacent to the rear wall, the rear wall of the cabin and the front wall of the cargo box together defining a passthrough that connects a floor of the cargo box and a floor of the cabin;
a barrier, the passthrough being closeable by the barrier, the barrier being movable between a stowed position and an operating position, the barrier being offset of the passthrough in the stowed position, the barrier overlapping with the passthrough to block the passthrough in the operating position,
the barrier being rolled in the stowed position, the barrier being unrolled in the operating position.

13. The vehicle according to claim 12, wherein at least one of the front wall of the cargo box and the rear wall of the cabin includes one or more fasteners for maintaining the barrier in the operating position.

14. The vehicle according to claim 3, further comprising a cargo box frame that is fixedly mounted to the cargo box.

15. The vehicle according to claim 14, wherein the cargo box frame is movably connected to the cabin by a forward border of the cargo box frame, the forward border at least partially corresponds to a border of the passthrough.

16. The vehicle according to claim 15, wherein the cargo box frame includes a pair of crossbar siderails extending rearward of the forward border.

17. The vehicle according to claim 16, further comprising a rear crossbar that is removably attached to each of the crossbar siderails.

18. The vehicle according to claim 17, wherein the rear wall of the cabin includes a first rear light, and the rear crossbar includes a second rear light.

19. The vehicle according to claim 18, wherein the first rear and second rear lights are connected in parallel by a single electrical circuit.

* * * * *